INVENTORS
ROY H. CORNELY &
WALTER F. KOSONOCKY

BY Edward J. Norton
ATTORNEY

United States Patent Office 3,467,906
Patented Sept. 16, 1969

3,467,906
CONSTANT-GAIN LOW-NOISE LIGHT AMPLIFIER
Roy H. Cornely, Skillman, and Walter F. Kosonocky, Iselin, N.J., assignors to Radio Corporation of America, a corporation of Delaware
Filed June 14, 1967, Ser. No. 646,115
Int. Cl. H01s 3/18
U.S. Cl. 330—4.3                                        7 Claims

ABSTRACT OF THE DISCLOSURE

A semiconductor injection laser diode provided with a high Q resonant cavity across the width thereof and a low Q cavity across the length thereof is effective in providing constant-gain low-noise amplification of light transmitted through the diode parallel to the length thereof, if the injection laser is pumped by a forward current of a minimum magnitude at least equal to the oscillation lasing threshold of the diode in a direction parallel to the width thereof.

---

Figure 1:
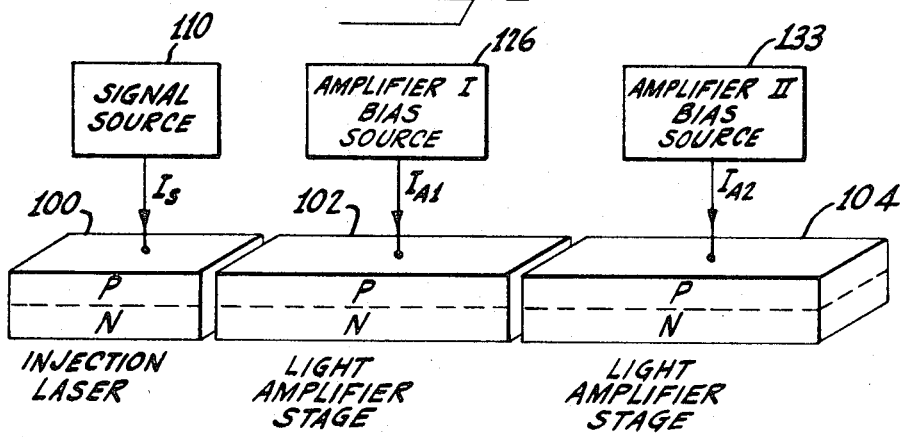

The invention herein described was made in the course of or under a contract or subcontract thereunder with the Department of the Air Force.

This invention relates to light amplifiers and, more particularly, to a constant-gain low-noise stimulated emission light amplifier.

The term "light," as used herein, includes ultraviolet light, visible light and infra-red light.

Light amplification by stimulated emission, as known in the art, utilizes a so-called active lasing medium, which may be in the form of a gas, a liquid, a glass, a crystal or a semiconductor. An active lasing medium is characterized by the fact that the population of atoms or molecules thereof may have its energy level distribution inverted when properly excited by pumping energy applied thereto from a pumping energy source.

When an excited atom or molecule falls from a higher energy level to a lower energy level it emits a photon of electromagnetic energy, which photon has a frequency equal to the difference in these two energy levels divided by Planck's constant. There is a certain chance that an emission of a photon will take place spontaneously from any given excited atom or molecule of the medium. However, an excited atom or molecule may be stimulated to emit a photon by interaction with an already existing photon of the same frequency. It is known that the chance that stimulated emission of photons occurs is a direct function of the proportion of the atoms or molecules in the population which are then in their excited state, the number of already existing photons of the proper frequency which are capable of stimulating emission of these excited atoms or molecules, and the probability of interaction between any existing photon and an excited atom or molecule of the population. The proportion of excited atoms or molecules which exist in the medium at any given time is a variable which is a function of the rate at which pumping energy is applied to the medium and the rate at which photons are being produced either spontaneously or by stimulated emission. Also, the number of already existing photons of the proper frequency which are capable of stimulating emission is a variable which is a function of the effective amount of reflection of photons which takes place within the active lasing medium.

As is also known, an active lasing medium may be operated as an oscillator to generate electromagnetic oscillations in the light spectrum by stimulated emission or it may be operated as a light amplifier to amplify the intensity of input light of an appropriate frequency transmitted therethrough. More particularly, if the active lasing medium is placed in a cavity which is resonant to light of the appropriate frequency traveling in a given direction and the effective internal reflectivity of the cavity is such that the product of the gain of the lasing medium and the reflectivity of the cavity is equal to unity, oscillations will take place.

When an active lasing medium is utilized as a light amplifier, rather than as an oscillator, it is desired that the gain of the medium be quite high, so that significant light amplification takes place. However it is essential that oscillations be prevented from taking place. In the past, this has been achieved by making the reflectivity of the cavity small enough so that even though the gain of the active lasing medium is quite high, the product of this gain and the reflectivity of the cavity is still less than unity.

This prior art stimulated emission light amplifier has certain undesired features. First, the gain of the active lasing material is a function of the pumping power being applied. Since it is extremely difficult to maintain the the applied pumping power at just the right constant magnitude, the gain of prior art stimulated emission light amplifiers is hard to control. Second, even though lowering the reflectivity of the cavity sufficiently prevents unwanted oscillations from taking place, still spontaneous emission of photons at the frequency of the light being amplified takes place. This constitutes a high degree of noise inherent in prior art stimulated emission light amplifiers.

Even though prior art stimulated emission light amplifiers have these undesirable features, they are still very useful in both digital and analog systems because the transit time of the light therethrough is extremely short. In digital systems, such as computers, short transit time devices make it possible to increase the switching speeds at which computations may be made. In analog systems, short transit time devices make it possible to operate at higher frequencies.

The present invention is directed to an improved stimulated emission light amplifier which provides constant-gain low-noise light amplification, in addition to providing short transit time.

Briefly, this is accomplished by operating the light amplifier as a light oscillator for light traveling in a first predetermined light path through the active lasing medium of the amplifier and then while the active lasing medium is being pumped transmitting input light to be amplified through the medium over a second predetermined light path which is significantly different from the first predetermined light path.

It is therefore an object of the present invention to provide a constant-gain low-noise amplifier.

It is a further object of the present invention to provide such a light amplifier having either one or a plurality of cascaded stages.

Figure 2:
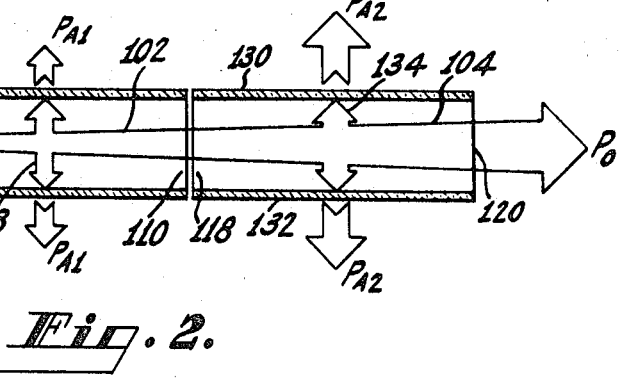

These and other objects, features and advantages of the present invention will become more apparent from the following detailed description taken together with the accompanying drawings, in which:

FIG. 1 is a block diagram of a preferred embodiment of the present invention; and FIG. 2 is a functional block diagram of this preferred embodiment of the present invention which is helpful in explaining the operation thereof.

For illustrative purposes the preferred embodiment of the invention shown in FIGS. 1 and 2 utilizes a semiconductor active lasing medium, such as GaAs for instance. More particularly, there is shown in FIGS. 1 and 2 an injection laser 100, a first light amplifier stage 102, and a second light amplifier stage 104. Each of elements 100, 102 and 104 comprises a semiconductor P-N junction diode composed of a semiconductor material such as GaAs which exhibits lasing properties. Injection laser 100 has high reflective end surfaces 106 and 108 oriented in parallel relationship with one another to provide an optical resonant cavity for light traveling in a direction parallel to the length of the injection laser 100. The reflective properties of end surfaces 106 and 108 may merely result from the highly different indices of refraction of the semiconductor material of which injection laser 100 is composed and the surrounding air. On the other hand, end surface 106 and/or end surface 108 may be provided with reflective coatings. In any case, while end surface 106 may be made either partially or totally reflecting, end surface 108 must be made only partially reflecting so that a light output can be obtained from injection laser 100. Injection laser 100 is pumped by forward current $I_s$ from signal source 110. The magnitude of current$I_s$ may vary in accordance with a signal in signal source 110.

Injection laser 100 is a conventional injection laser which produces a beam of coherent light in the region of the P-N junction of injection laser 100 in the longitudinal direction, which beam of light is indicated by arrow 112. So long as the magnitude of the current $I_s$ is above a predetermined threshold value the intensity of the light beam 112 is a direct function of the magnitude of current $I_s$. As shown in FIGS. 1 and 2, first light amplifier stage 102 and second light amplifier 104 are serially oriented in colinear relationship with the length of injection laser 100 and the direction of light beam 112. Therefore, light beam 112 will be applied as an input to first light amplifier stage 102 through left end surface 114 thereof. Similarly, any light emerging from right end surface 116 of first light amplifier stage 102 will be applied as an input to second light amplifier stage 104 through left end surface 118 thereof. The output from second light amplifier stage 104 is obtained from right end surface 120 thereof.

Light amplifier stage 102 has high reflective side surfaces 122 and 124 oriented in parallel relationship with one another to provide an optical resonant cavity for light traveling in a direction perpendicular to the length (parallel to the width) of light amplifier stage 102. On the other hand, the effective reflecting qualities of end surfaces 114 and 116 of light amplifier stage 102 are maintained quite small. This may be accomplished by the use of anti-reflection coatings on these end surfaces or by making these end surfaces unparallel. In any case, the cavity formed by end surfaces 114 and 116 of light amplifier 102 has a much lower Q than the resonant cavity formed by parallel reflective surfaces 122 and 124 thereof. Therefore, the lasing oscillation threshold for light traveling in a direction parallel to the width of light amplifier stage 102 is significantly lower than the lasing oscillation threshold for light traveling in a direction parallel to the length of light amplifier stage 102.

Pumping energy is obtained for light amplifier stage 102 by applying forward bias current $I_{A1}$ therethrough. Current $I_{A1}$ is obtained from amplifier I bias source 126. The magnitude of current $I_{A1}$ is at least sufficient to cause light amplifier stage 102 to generate a beam of coherent light in a direction parallel to the width of light amplifier stage 102, which beam of light is indicated by arrow 128. If reflective sides 122 and 124 are not totally reflective, coherent beams of light $P_{A1}$ will be produced as output beams from light amplifier stage 102 in a direction parallel to the width thereof and perpendicular to the length thereof.

Second light amplifier stage 104 is similar to first light amplifier stage 102. In particular, second light amplifier stage 104 is provided with parallel reflecting side surfaces 130 and 132 which define a high Q resonant cavity, and with end surfaces 118 and 120 thereof which define a low Q cavity. Amplifier II bias source 133 supplies forward current $I_{A2}$ as pumping energy to light amplifier stage 104. For reasons which will be discussed below the magnitude of current $I_{A2}$ is preferably made larger than the magnitude of forward current $I_{A1}$. Second light amplifier stage 104 will therefore generate a beam of coherent light, indicated by arrow 134, in a direction parallel to the width thereof and perpendicular to the length thereof. If side surfaces 130 and 132 are not totally reflective, this will result in output light beams $P_{A2}$ being formed in a direction perpendicular to the length parallel to the width of second light amplifier stage 104.

Elements 100, 102 and 104 may be physically joined to each other to provide a unitary integral structure by a material having good optical coupling but a high electrical resistance which material connects end surface 108 with end surface 114 and also connects end surface 116 with end surface 118.

Consider now the operation of a light amplifier stage of the present invention in the absence of any input light to be amplified being applied thereto. In this case, the population of atoms or molecules thereof are excited by the pumping current therethrough at a rate which depends both upon the magnitude of the pumping current and the proportion of molecules or atoms which are in the ground state at any time, and, hence, are susceptible of being excited. On the other hand, the rate at which excited molecules or atoms fall back from their excited state to their ground state depends upon the sum of spontaneous emission plus stimulated emission which takes place. Spontaneous emission results in the emitted photon traveling in any random direction. Stimulated emission results in the emitted photon traveling in phase and in the same direction as the photon which stimulated the emission. Since each of the light amplifier stages of the present invention are provided with an optical resonant cavity which highly favors stimulated emission in a direction perpendicular to the length thereof and parallel to the width thereof, the proportion of spontaneous emission which is taking place will be insignificantly small compared to the proportion of stimulated emission taking place, and, further, substantially all the stimulated emission will take place in a direction perpendicular to the length of the light amplifier stage and parallel to the width thereof. The intensity of this emission, which corresponds to the rate at which excited atoms or molecules fall back to their ground state, is a direct function of the proportion of the atom or molecule population which is in its excited state.

From the foregoing it will be seen that an equilibrium will be reached in the proportion of the atom or molecule population which is in its excited state, and that the value of this equilibrium proportion depends upon the magnitude of the pumping current. More particularly, as the pumping current is increased, the proportion of excited atoms or molecules in the population rises, which results in an increase in the intensity of the coherent light which is emitted in a direction perpendicular to the length of the amplifier. This causes a new somewhat higher equilibrium proportion of excited atoms or molecules in the population to be reached.

From the above it will be seen that in the absence of any input to be amplified applied through the amplifier in a direction perpendicular to the width thereof and parallel to the length thereof, there will be a negligible light output from the light amplifier in a direction parallel to the length thereof and perpendicular to the width thereof. In fact, any such output, which constitutes a noise output from the light amplifier, will be much smaller in the presence of laser oscillation in a direction parallel to the width of the amplifier than it would if the light amplifier were not caused to oscillate in a direction parallel to the width thereof, as is the case in prior art light amplifiers. The reason for this is that with no input light to be amplified applied, but with pumping current applied, spontaneous emission of photons in random directions takes place to a considerable degree in prior art light amplifiers. The portion of these photons which happen to be traveling in a direction parallel to the length of the light amplifier constitute a relatively high unwanted noise signal. However, in the present invention, in the absence of an applied input light to be amplified, the vast majority of excited atoms or molecules are stimulated to emit photons in a direction parallel to the width of the light amplifier, rather than parallel to the length thereof, long before they would otherwise spontaneously emit photons. This, for the most part, eliminates the generation of photons by spontaneous emission in random directions and, hence, the portion of such spontaneously emitted photons which happen to be traveling in a direction parallel to the length of the light amplifier. This is the reason that the present invention provides a low-noise light amplifier.

When photons of input light to be amplified of a proper frequency to stimulate emission of photons by the excited atoms or molecules of the light amplifier is applied in a direction parallel to the length of the light amplifier, these input light photons compete with the self-generated photons, such as shown in beam 128 or 134, in stimulating emission from the excited atoms or molecules then in the population. Since a stimulated photon is in phase with and travel in the same direction as the photon which stimulated its emission, the result of introducing photons of input light to be amplified into the amplifier in a direction parallel to the length of the amplifier is to cause amplification of the light traveling in a direction parallel to the length of the amplifier at the expense of the self-generated coherent light, such as the light beams 128 and 134, traveling in a direction perpendicular to the length of the light amplifier and parallel to the width thereof.

The gain of the present amplifier is a constant which depends on the dimensions of the two respective light paths. In particular, the gain is a direct function of the ratio of the length of an amplifier stage to its width, and is independent of the pumping current applied to the light amplifier stage so long as the pumping current is sufficient to maintain oscillations therein in a direction parallel to the width thereof.

It will be seen that since the gain of a light amplifier made in accordance with the present invention is constant, the power output thereof is proportional to the intensity of the light applied as an input thereto. Thus a light amplifier stage operating at a higher power level, such as second light amplifier stage 104, must supply more additional power to the light beam being amplified than a light amplifier stage operating at a lower power level, such as first light amplifier stage 102. Since this additional light power is obtained at the expense of the self-generated light beam within the stage which travels in a direction parallel to the width thereof, such as light beams 128 and 134, it is desirable that the intensity of the self-generated light beam of the high power level stage, such as light beam 134, be higher than the intensity of the self-generated light beam of the low power level stage, such as light beam 128. Further, since the relative intensities of light beams 128 and 134, respectively, are a direct function of the relative magnitudes of pumping currents $I_{A1}$ and $I_{A2}$, respectively, the magnitude of pumping current $I_{A2}$ for second light amplifier stage 104 is made higher than the magnitude of pumping current $I_{A1}$ of first light amplifier stage 102.

The showing of two cascaded light amplifiers in FIGS. 1 and 2 is purely illustrative. It is clear that the present invention will operate with only a single light amplifier stage or will operate with more than two light amplifier stages in cascade. Further, the source of light does not necessarily have to be obtained from an injection laser in physical proximity to the light amplifier. The input light may equally as well be obtained from a distant source. Further, the cascaded light stages do not necessarily have to be in colinear relationship, as shown in FIGS. 1 and 2. It is possible to have the cascaded stages angularly disposed with respect to each other and use mirrors to direct the output light from one stage as input light to the next successive stage. Also, it is not essential that the path of the light to be amplified and the self-generated light oscillations within each light stage be perpendicular to each other, so long as that these two light paths are significantly different from each other. In addition, although the preferred embodiment shown in FIGS. 1 and 2 utilizes semiconductors as the active lasing material, it is to be understood that the principles of the present invention to obtain low-noise constant-gain light amplification may be utilized with all other types of active lasing material. For these reasons it is not intended that the invention be restricted to the preferred embodiments described in detail herein, but that it be limited only by the true spirit and scope of the appended claims.

What is claimed is:

1. A device for amplifying light of a given frequency comprising a given volume of an active lasing medium capable of stimulated emission at substantially said given frequency, first means for rendering the oscillation lasing threshold substantially throughout the volume of said medium for a first predetermined light path through said medium at a certain value which is significantly smaller than the lasing oscillation threshold substantially throughout the volume of said medium for any other light path through said medium, second means for applying input light of said given frequency for transmission through said medium over a second predetermined light path which is significantly different from said first predetermined light path, and third means effective while said input light is being applied for providing a constant gain for said applied input light which is a function of the length of said second predetermined light path and is independent of the value to which said medium is pumped by pumping said medium to a value which is at least equal to said certain value for all levels of said applied input light, whereby stimulated emission of light takes place continuously over said first predetermined light path and said input light experiences said constant gain.

2. The device defined in claim 1, wherein said active lasing material is a semiconductor P-N junction diode, wherein said first means includes reflective means oriented to provide a relatively high Q resonant cavity for light of said given frequency traveling in a direction substantially perpendicular to a given direction and to provide a relatively low Q cavity for light of said given frequency traveling in a direction substantially parallel to said given direction, wherein said third means comprises means for applying a forward current through said diode of a magnitude sufficient to cause coherent light to be continuously generated in a direction substantially perpendicular to said given direction for all magnitudes of said input light up to and including said given maximum magnitude, and wherein said second means is effective in transmitting said input light through said medium in said given direction.

3. The device defined in claim 2, wherein the extent of said diode in a direction parallel to said given direction is longer than the extent of said diode in said direction perpendicular to said given direction.

4. The device defined in claim 2, wherein said second means comprises an injection laser including a forwardly biased second P-N junction diode for generating said input light of said given frequency.

5. The device defined in claim 4, wherein said second diode is located in colinear relationship with respect to said first-named diode and is oriented to generate said input light in said given direction.

6. The device defined in claim 2, wherein said device further includes a second stage comprised of a second active lasing material which is a semiconductor P-N junction diode, additional reflective means oriented to provide a relatively high Q resonant cavity for light of said given frequency traveling through said second active lasing material in a direction substantially perpendicular to a second given direction and to provide a relatively low Q cavity for light of said given frequency traveling through said second active lasing material in a direction substantially parallel to said second given direction, additional means for applying a forward current through said second active lasing material diode of a magnitude sufficient to cause coherent light to be continuously generated in a direction substantially perpendicular to said second given direction for all magnitudes of input light applied thereto, and coupling means for applying light of said given frequency which has been transmitted through and been amplified by said first-named active lasing material as input light to be transmitted through said second active lasing material in said second given direction, whereby said light of said given frequency is further amplified with constant gain by said second stage.

7. The device defined in claim 6, wherein said first-named diode and said second diode are located in co-linear relationship with said first-named given direction and said second given direction being the same as each other.

References Cited

Kosonocky et al. "IEEE Spectrum," March 1965, pp. 181–195 (pp. 189–191 relied on).

JOHN KOMINSKI, Primary Examiner

DARWIN R. HOSTETTER, Assistant Examiner

U.S. Cl. X.R.

330—5, 34, 53, 127, 148; 331—94.5